United States Patent
Hayashi

(10) Patent No.: US 6,688,824 B2
(45) Date of Patent: Feb. 10, 2004

(54) CARRIAGE FIXING SCREW HOUSING STRUCTURE

(75) Inventor: Eiichi Hayashi, Saitama (JP)

(73) Assignee: Fuji Photo Optical Co., Ltd. (JP)

( * ) Notice: Subject to any disclaimer, the term of this patent is extended or adjusted under 35 U.S.C. 154(b) by 0 days.

(21) Appl. No.: 10/106,647

(22) Filed: Mar. 26, 2002

(65) Prior Publication Data

US 2002/0140874 A1 Oct. 3, 2002

(30) Foreign Application Priority Data

Mar. 30, 2001 (JP) .................................... 2001-102635

(51) Int. Cl.[7] .......................... F16B 39/10; G03B 27/04
(52) U.S. Cl. .................... 411/119; 411/533; 411/970; 411/999; 358/474; 355/97; 362/374
(58) Field of Search ................ 411/119, 437, 411/525, 526, 533, 970, 999; 362/374; 358/474; 355/97; 399/107

(56) References Cited

U.S. PATENT DOCUMENTS

| | | | | |
|---|---|---|---|---|
| 3,084,958 A | * | 4/1963 | Appleton | 411/999 |
| 3,218,906 A | * | 11/1965 | Dupree | 411/533 |
| 3,289,726 A | * | 12/1966 | Sauter | 411/999 |
| 3,967,049 A | * | 6/1976 | Brandt | 411/533 X |

OTHER PUBLICATIONS

U.S. application No. 09/756,420, filed Jan. 8, 2001, entitled Carriage Securing Structure for Image Processor.

* cited by examiner

*Primary Examiner*—Neill Wilson
(74) *Attorney, Agent, or Firm*—Price, Heneveld, Cooper, DeWitt & Litton, LLC

(57) ABSTRACT

A carriage fixing screw housing structure in which a carriage fixing screw for externally screwing and fixing carriages of an image reader is held, when not used, by a screw holder formed on a part of an image reader to prevent loss of the carriage fixing screw after removed from the carriage. A screw holder is formed on a part, such as the back face of the main body of an image reader, and includes a holder to hold the threaded part of a carriage fixing screw and a housing 23 to house the head of the fixing screw.

14 Claims, 4 Drawing Sheets

CARRIAGE FIXING SCREW HOUSING STRUCTURE

BACKGROUND OF THE INVENTION

1. Field of the Invention

The present invention relates to a stationary original type image reader which reads image information formed by light beams reflected from an original irradiated by a light source lamp moving over the original and particularly to a housing structure for a carriage fixing screw by which a carriage can be fixed with an external screw.

2. Description of the Related Art

An image reader of stationary original type such as a copying machine, scanner, etc. to read and process an original image e.g. on a piece of paper placed on a platen glass is provided with a carriage to scan the original. This carriage comprises e.g. a light source lamp to illuminate an original, a reflector to form an optical path to pick up a target image on the original and guide it to an image processor such as CCD (Charge Coupled Device), etc. This carriage is moved along the original to scan and pick up an image formed on the original.

The optical path length from an image face to the image processor must be kept at a predetermined length even when the carriage moves. To this effect, it has a combined structure consisting of a full rate carriage moving over a distance covering the whole face of an original and a half rate carriage covering the half of that of the full rate carriage. In other words, the full rate carriage comprises a first reflector to receive incidence of an image of an original, while the half rate carriage comprises a second reflector to receive incidence of an image reflected on the first reflector and a third reflector to receive incidence of an image reflected on the first reflector, whereby an image reflected on the third reflector is incident on an image processor. Then, the full rate and half rate carriages are moved as connected with and pulled by wire wound around a pulley thanks to the power of a motor.

The full rate and half rate carriages are both movable so that they may be moved if externally shocked or vibrated. Continuous shocks, if any, e.g. when being transported, may deviate the angle of each reflector or even damage the carriages if violently moved. Therefore, each carriage is externally fixed with a carriage fixing screw e.g. in the case of transporting an image reader.

This carriage fixing screw is used until the image reader is placed as predetermined for use. Conventionally, this carriage fixing screw used to be removed and collected e.g. by a mover or stored in the vicinity of the image reader, since the image reader is typically not moved, once set at a predetermined place. However, with offices moving more and more often nowadays, inevitably image readers are moved more frequently, necessitating the use of a carriage fixing screw to prevent any unintended movement of the carriage when being moved.

However, a carriage fixing screw, if collected by a mover, can not be used any more, while it may be forgotten or lost after a long period, even if stored in the vicinity of the image reader. Then, the image reader is carried without fixing the carriage, with the risk of damage or deformation due to unintended movement of the carriage. Moreover, the necessity of fixing it with a carriage fixing screw in itself may be forgotten, when carrying the image reader.

SUMMARY OF THE INVENTION

An object of the present invention is to provide a housing structure for a carriage fixing screw to prevent missing of a carriage fixing screw, removed from an image reader settled at a predetermined place and not needed until another opportunity of transport and to remind of the necessity of fixing the carriage, when moving the image reader.

As technical means to achieve the above object, a housing structure for a carriage fixing screw according to the present invention is characterized in that a carriage fixing screw is provided for externally screwing and fixing a carriage carrying a light source lamp thereon and a carriage carrying a reflector for guiding a reflected light beams to a light receiving station is held, when not used, by a screw holder formed on a part of an image reader in which a light source lamp moves over an original placed on a platen glass.

A carriage fixing screw removed from an image reader is housed in the above screw holder. As a result, the carriage fixing screw is stored in the image reader in itself. Then, the carriage fixing screw is prevented from being lost. Moreover, the presence of this carriage fixing screw is noticed, when trying to carry again the image reader, to remind of the necessity of fixing the carriage.

A housing structure for a carriage fixing screw according to the present invention is characterized in that the above screw holder comprises a holder to hold the threaded part and a housing to house the head of the above carriage fixing screw. The threaded part of the carriage fixing screw is held, while the head is housed in the above housing to prevent the carriage fixing screw from projecting around the image reader. As a result, the appearance of the image reader is not compromised and the user of the image reader is protected from the risk of being hooked by the carriage fixing screw by mistake.

Moreover, the housing structure for a carriage fixing screw is characterized in that the above screw holder is formed on a back face of the main body of the above image reader. Thus, the carriage fixing screw is invisibly housed when using the image reader as usual. Then, the carriage fixing screw is prevented from being lost without compromising the appearance of the image reader.

This housing structure for a carriage fixing screw is characterized in that the screw holder is formed on a back face of a lid covering the platen glass of the above image reader. When attached to the main body of the device, the threaded part of the carriage fixing screw projects inside of the main body. As a result, it requires a space to place this threaded part, likely to restrict the degree of freedom to arrange the respective parts inside the main body of the device. On the other hand, a screw holder arranged on a lid is hardly detrimental to the degree of freedom to arrange the respective parts, without compromising the appearance of the image reader.

These and other features, objects and advantages of the present invention will become apparent upon reading the following description thereof together with reference to the accompanying drawings.

DETAILED DESCRIPTION OF THE EMBODIMENTS

Figure 3:
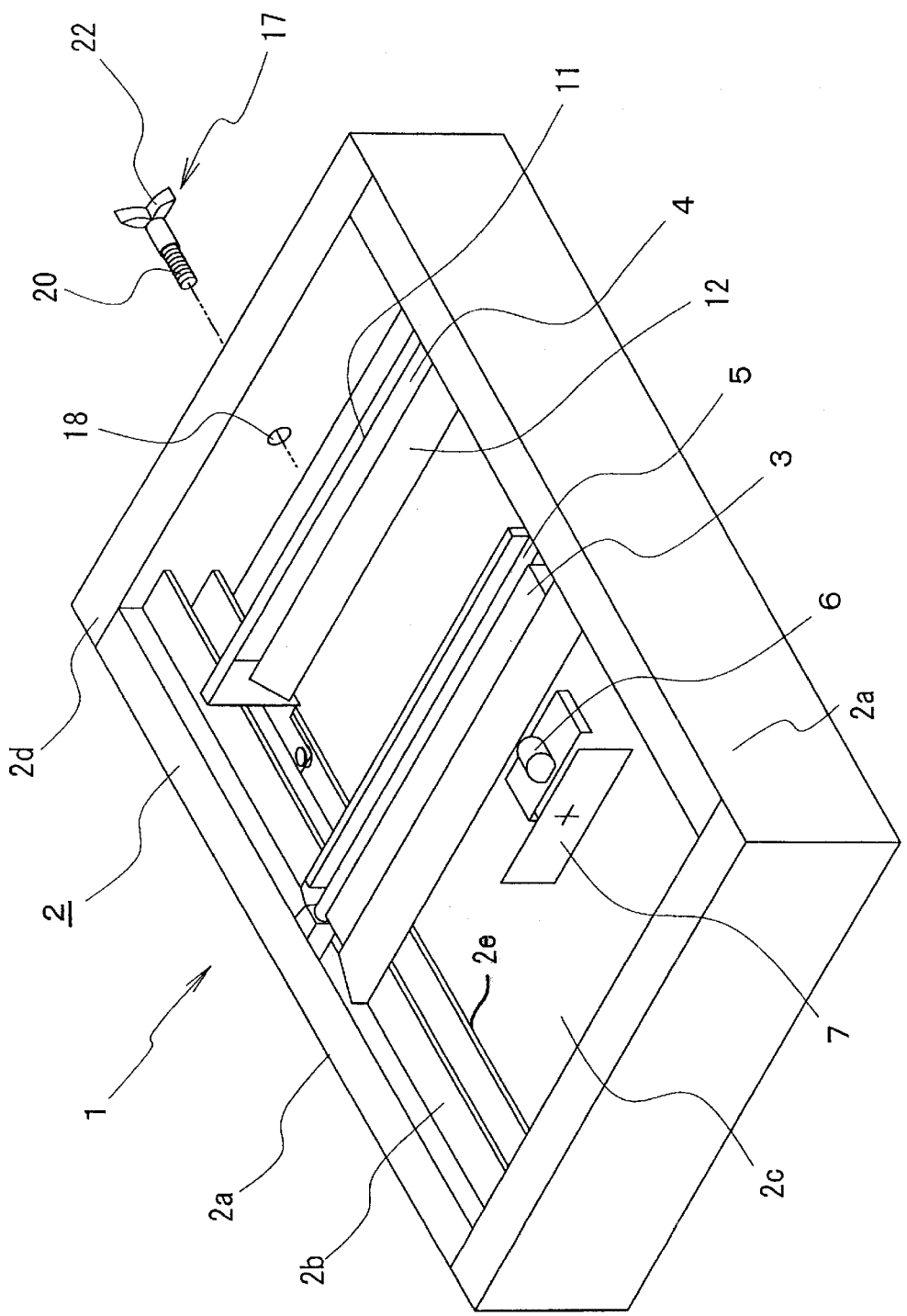
FIG. 3 is a schematic perspective view of an image reader.
Figure 4:
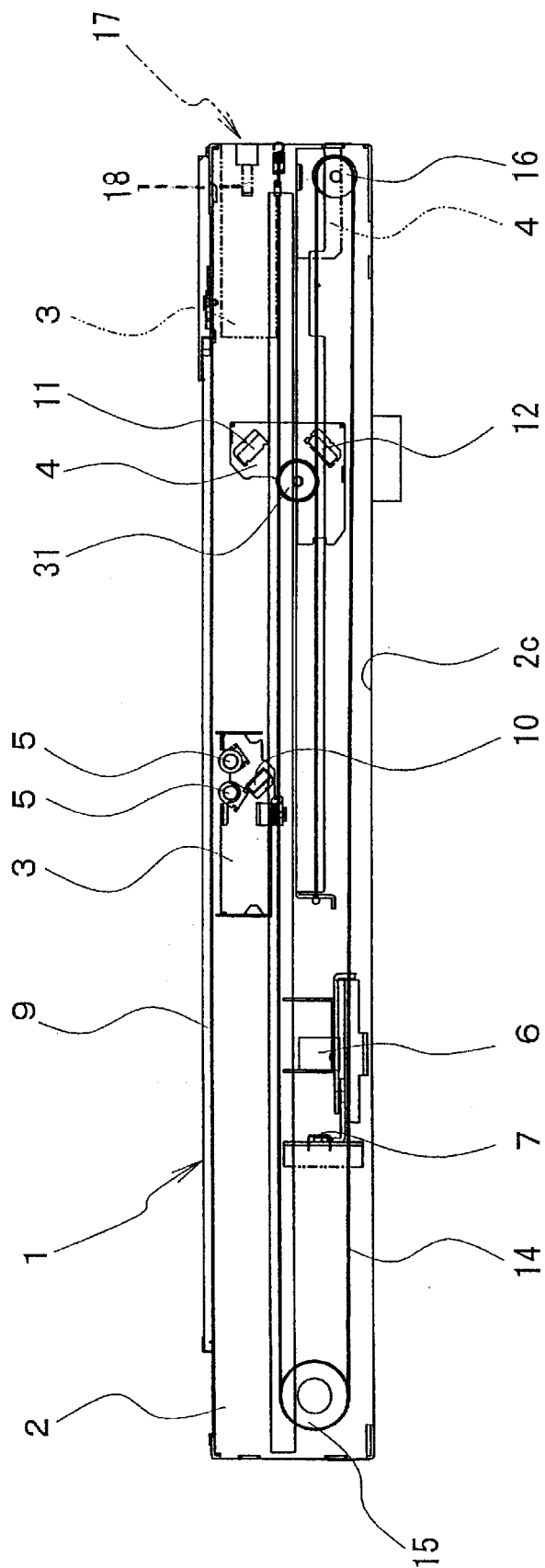
FIG. 4 is a schematic side view of an image reader.

The carriage fixing screw holding structure of the present invention will be concretely explained here below, referring to illustrated preferred embodiments. FIG. 3 is a perspective view for roughly showing the structure of a stationary original type image reader 1 appropriate to have such a carriage fixing screw holding structure and FIG. 4 is a schematic side view. Image reader 1 has a pair of shelf-like guide plates 2b, 2e on the inner face of longitudinal walls 2a of casing 2. These guide plates 2b, 2e respectively carry full rate carriage 3 and half rate carriage 4, each guided by guide plates 2b, 2e to move in the longitudinal direction of casing 2. A platen glass 9 (FIG. 4) is arranged on the upper surface of casing 2 to place an original on the platen glass. Full rate carriage 3 has light source lamp 5 such as a fluorescent lamp to illuminate the original. In addition, casing 2 has, anywhere appropriate on bottom plate 2c, image focusing lens 6 and photoelectric converter device 7 such as CCD (Charge Coupled Device).

The full rate carriage 3 has first reflector 10 (FIG. 4), while half rate carriage 4 has second reflector 11 and third reflector 12. Light beams, irradiated with light source lamp 5 and reflected by an original, is reflected by the first reflector 10, second reflector 11 and third reflector 12 by turns, transmitted through image focusing lens 6, in order to be incident on photoelectric converter device 7. Then, these first reflector 10, second reflector 11 and third reflector 12 form an optical path from an original to photoelectric converter device 7.

As described above, full rate carriage 3 is made to be movable all over platen glass 9, since an original must be totally illuminated to obtain image information of the original. The optical path to reach photoelectric converter device 7 must keep a constant length in spite of this movement of full rate carriage 3. To this effect, half rate carriage 4 is set to move approximately half as much as full rate carriage 3 and is synchronized with full rate carriage 3 in order to keep the constant distance of the optical path. Carriages 3, 4 are connected with wire 14 and driven by pulleys 15, 16, 31.

As shown in FIG. 3, a through hole 18 is formed on wall 2d where carriages 3, 4 are clustered. Carriage fixing screw 17 to fix carriages 3, 4 is inserted through this through hole 18 to be screwed with carriages 3, 4. In other words, as shown with two-dot chain line 18'representing a threaded aperture in FIG. 4, carriages 3, 4 are clustered against wall 2d and carriage fixing screw 17 passes from outside into through hole 18 to be screwed into and fixed to full rate carriage 3. As a result, wall 2d and full rate carriage 3 are fixed, while half rate carriage 4 is fixed between wall 2d and full rate carriage 3, to fix these carriages 3, 4 together. Carriage-fixing screw 17 is of known type, formed of threaded part 20 forming a male screw and head 22 held to rotate the threaded part 20.

Figure 1:
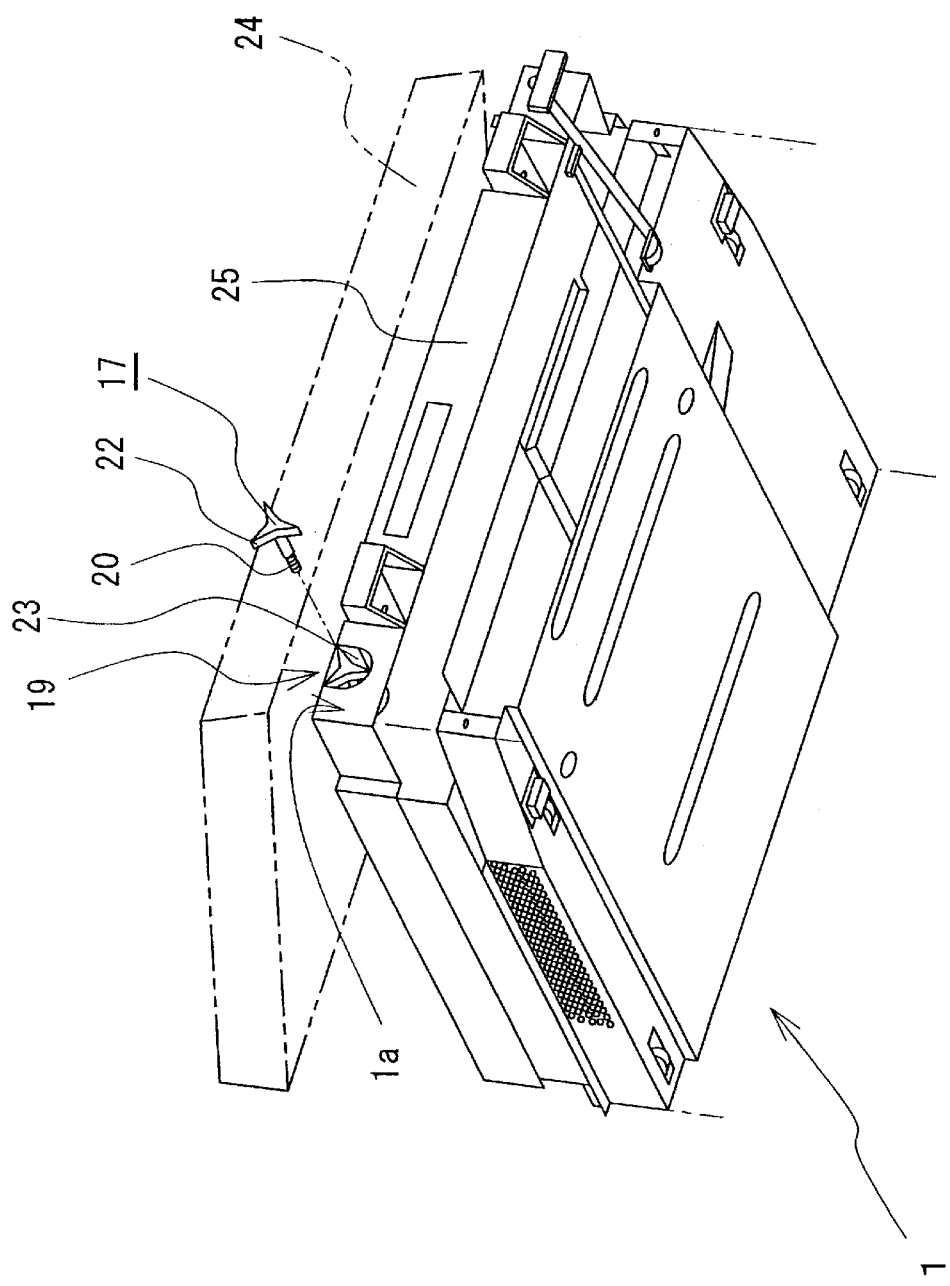
FIG. 1 is a schematic perspective view of an image reader having a carriage fixing screw structure of the present invention.
Figure 2:
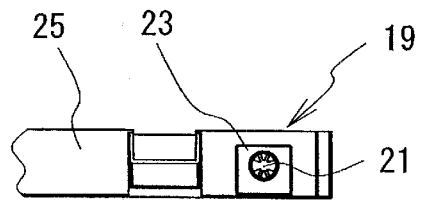
FIG. 2a is a fragmentary front view of the carriage fixing screw structure, without a carriage fixing screw.
FIG. 2b is a fragmentary front view with a carriage fixing screw.
FIG. 2c is a fragmentary top plan view with a carriage fixing screw.
FIG. 2d is a partially cut side view with a carriage fixing screw.
Figure 2:
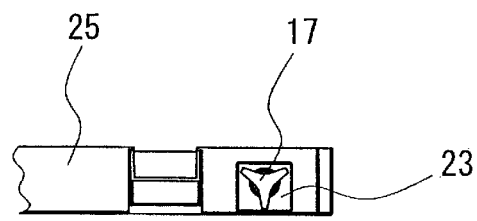
Figure 2:
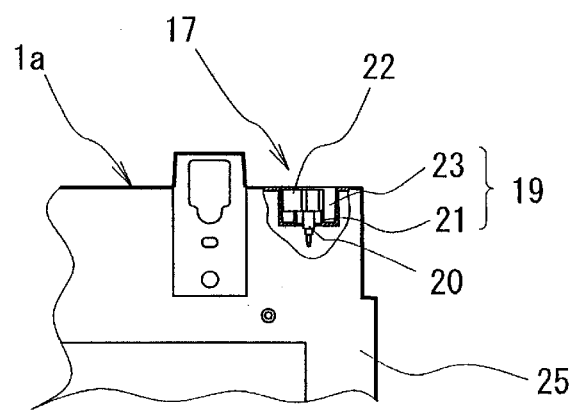
Figure 2:
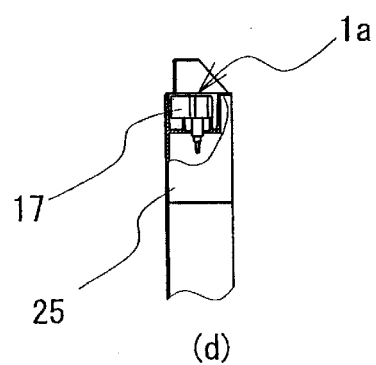

Screw holder 19 of the carriage fixing screw housing structure in this embodiment is formed on a part of image reader 1, as shown in FIGS. 1 and 2, to hold carriage fixing screw 17, when not used. This screw holder 19 is formed on back face 1a of the main body of image reader 1. In this embodiment, this screw holder 19 is formed on the back face of cover member 25 of the main body of image reader 1.

The above screw holder 19 comprises holder 21 (FIGS. 2a–2d) to hold threaded part 20 of carriage fixing screw 17 and recessed housing 23 to house head 22. The holder 21 has a plurality of inwardly projecting, resilient teeth surrounding threaded part 20. Then, threaded part 20 is inserted into a center section surrounded by tips of the respective teeth and held by elastic deformation of these teeth. Housing 23 is formed by a recess made on the main body back face 1a into a shape capable of housing head 22. In FIG. 1, lid 24 covers platen glass 9.

Carriage fixing screw 17, once removed from full rate carriage 3, is held by inserting it into screw holder 19. Then, threaded part 20 of carriage fixing screw 17 is inserted into holder 21 to be held by the teeth of the holder 21, to house head 22 of carriage fixing screw 17 in the housing 23. Removed carriage fixing screw 17 is thus held by screw holder 19 to prevent carriage fixing screw 17 from being separated from image reader 1, thereby prevent missing of carriage fixing screw 17.

In addition, head 22 is housed, also holding threaded part 20 of carriage fixing screw 17, thereby preventing carriage fixing screw 17 from projecting from image reader 1. As a result, a user of image reader 1 can be protected from the risk of being hooked by carriage fixing screw 17 by mistake, without compromising the appearance of image reader 1. Moreover, carriage-fixing screw 17 is held on back face 1a of image reader 1, relatively unnoticed, to avoid compromising the appearance of image reader 1.

Although the present embodiment is explained referring to a structure where the screw holder 19 is arranged on back face 1a of the main body of image reader 1, it may also be formed into lid 24 covering platen glass 9 of image reader 1. Also, screw holder 19 may be formed to hold head 22 of fixing screw 17.

Additionally, head 22 may project from back face 1a, without being housed, when screw holder 19 is placed anywhere unnoticeable such as back face 1a of the main body. Then, screw holder 19 can be formed even without a space to form housing 23, since housing 23 is not needed, if only holder 21 is available.

As explained above, a carriage fixing screw can be stored, when not used, anywhere appropriate in an image reader in the housing structure of a carriage fixing screw according to the present invention, to prevent the carriage fixing screw from being separated from the image reader or missed. In addition, a user is reminded of the presence of the carriage fixing screw and of the necessity to fix the carriage, when carrying again the image reader, since it is stored in the image reader, also preventing damage on the carriage during transport.

The carriage fixing screw does not project outside of the image reader, as held by the screw holder, in the carriage fixing screw housing structure comprising a holder to hold the threaded part of the carriage fixing screw and a housing to house the head. Therefore, the appearance of the image reader is not compromised, while a user of the image reader is protected from the risk of being hooked by the carriage fixing screw by mistake.

In addition, the carriage fixing screw is held relatively unnoticed, in the carriage fixing screw housing structure where the screw holder is formed on a back face of the main body of the image reader to prevent missing of the carriage fixing screw, also without compromising the appearance of the image reader. Moreover, no storage space is needed in the main body of the device to store the carriage fixing screw with almost no restriction of degree of freedom in design and arrangement of the respective parts inside the main body of the image reader, in the carriage fixing screw housing structure where the screw holder is formed on a back face of a lid covering the platen glass of the image reader.

It will become apparent to those skilled in the art that various modifications to the preferred embodiment of the invention as described herein can be made without departing from the spirit or scope of the invention as defined by the appended claims.

What is claimed is:

1. A carriage fixing screw housing structure for storing a carriage fixing screw used for fixing a carriage carrying a light source lamp thereon and a carriage carrying a reflector for guiding reflected light beams to a light receiving station for transportation comprising:

an image reader having a main body; and a screw holder formed on a face of the main body of the image reader for removably holding the carriage fixing screw when not in use.

2. A carriage fixing screw housing structure as defined in claim 1 wherein the screw holder comprises a holder to hold a threaded part and a recessed housing to house a head of the carriage fixing screw.

3. A carriage fixing screw housing structure as defined in claim 1 wherein the screw holder is formed on a back face of the main body of the image reader.

4. A carriage fixing screw housing structure as defined in claim 2 wherein the screw holder is formed on a back face of the main body of the image reader.

5. A carriage fixing screw housing structure as defined in claim 1 wherein said screw holder includes an aperture having a plurality of inwardly projecting resilient teeth for gripping the threaded end of said fixing screw.

6. A carriage fixing screw housing structure as defined in claim 5 wherein said housing structure further includes a recessed housing shaped to receive and contain the head of said fixing screw.

7. A carriage fixing screw housing structure for storing a carriage fixing screw used for fixing a carriage carrying a light source lamp thereon and a carriage carrying a reflector for guiding reflected light beams to a light receiving station for transportation of an image reader having a lid covering a platen glass comprising:

a screw holder formed on a back face of a lid covering the platen glass of the image reader.

8. A carriage fixing screw housing structure as defined in claim 7 wherein the screw holder comprises a holder to hold a threaded part and a recessed housing to house a head of a carriage fixing screw.

9. An image processor having a main body and a cover and a carriage carrying a light source lamp thereon and a carriage carrying a reflector for guiding reflected light beams to a light receiving station, said body including an aperture for receiving a carriage fixing screw for securing said carriage during transportation, said fixing screw having a head and a threaded end wherein the improvement comprises:

a screw holder mounted to said body, said screw holder including a recessed housing and an aperture for removably holding the threaded end of the carriage fixing screw.

10. An image processor as defined in claim 9 wherein said screw holder includes an aperture having a plurality of inwardly projecting resilient teeth for gripping the threaded end of said fixing screw.

11. An image processor as defined in claim 10 wherein said housing structure further includes a recessed housing shaped to receive and contain the head of said fixing screw.

12. An image processor as defined in claim 10 wherein said housing structure further includes a recessed housing shaped to receive and contain the head of said fixing screw.

13. An image processor having a main body and a cover and a carriage carrying a light source lamp thereon and a carriage carrying a reflector for guiding reflected light beams to a light receiving station, said body including an aperture for receiving a carriage fixing screw for securing said carriage during transportation, said fixing screw having a head and a threaded end wherein the improvement comprises:

a screw holder mounted to said cover, said screw holder including a recessed housing and an aperture for removably holding the threaded end of the carriage fixing screw.

14. An image processor as defined in claim 13 wherein said screw holder includes an aperture having a plurality of inwardly projecting resilient teeth for gripping the threaded end of said fixing screw.

\* \* \* \* \*